US009835116B2

(12) United States Patent
Kuenzel

(10) Patent No.: US 9,835,116 B2
(45) Date of Patent: Dec. 5, 2017

(54) INTERNAL COMBUSTION ENGINE FOR A MOTOR VEHICLE, AND METHOD FOR OPERATING SUCH AN INTERNAL COMBUSTION ENGINE

(71) Applicant: Daimler AG, Stuttgart (DE)

(72) Inventor: Stefan Kuenzel, Waiblingen (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 14/904,046

(22) PCT Filed: Jul. 8, 2014

(86) PCT No.: PCT/EP2014/001875
§ 371 (c)(1),
(2) Date: Jan. 8, 2016

(87) PCT Pub. No.: WO2015/003801
PCT Pub. Date: Jan. 15, 2015

(65) Prior Publication Data
US 2016/0169167 A1 Jun. 16, 2016

(30) Foreign Application Priority Data

Jul. 10, 2013 (DE) ........................ 10 2013 011 587

(51) Int. Cl.
*F02M 26/43* (2016.01)
*F02D 41/00* (2006.01)
(Continued)

(52) U.S. Cl.
CPC ........... *F02M 26/43* (2016.02); *F01N 13/107* (2013.01); *F02B 37/025* (2013.01); *F02D 17/02* (2013.01);
(Continued)

(58) Field of Classification Search
CPC ........ F02M 26/43; F02M 26/41; F02M 26/05; F02M 26/71; F02M 26/16; F02D 41/0087; F02D 17/02; F01N 13/107; F02B 37/025
(Continued)

(56) References Cited

U.S. PATENT DOCUMENTS 3,383,092 A * 5/1968 Cazier ................. F02B 37/02
415/186
4,179,892 A * 12/1979 Heydrich ................ F02B 37/00
60/605.2
(Continued)

FOREIGN PATENT DOCUMENTS

CN         1737350 A     2/2006
DE   10 2008 064 264 A1    6/2010
(Continued)

OTHER PUBLICATIONS

PCT/EP2014/001875, International Search Report (PCT/ISA/220 and PCT/ISA/210) dated Oct. 23, 2014, with partial English translation, enclosing Written Opinion of the International Searching Authority (PCT/ISA/237) (Eleven (11) pages).
(Continued)

*Primary Examiner* — Jason Shanske
*Assistant Examiner* — Jason T Newton
(74) *Attorney, Agent, or Firm* — Crowell & Moring LLP

(57) ABSTRACT

An internal combustion engine for a motor vehicle is disclosed. The engine has at least two combustion chambers and an exhaust gas tract with at least one exhaust gas duct associated with the combustion chambers and through which exhaust gas from the combustion chambers can flow to guide the exhaust gas to a turbine of an exhaust gas turbocharger. An exhaust gas return line branches off the exhaust gas duct and has an adjustable shut-off element, by
(Continued)

which a respective cross section, through which exhaust gas can flow, of the exhaust gas recirculation line and the exhaust gas duct can be adjusted. The internal combustion engine can be operated in a cylinder shut-down mode, in which introduction of fuel into a first of the combustion chambers is prevented and introduction of fuel into the second combustion chamber takes place. A method for operating the internal combustion engine is also disclosed.

8 Claims, 1 Drawing Sheet

(51) Int. Cl.
    *F01N 13/10*         (2010.01)
    *F02B 37/02*         (2006.01)
    *F02D 17/02*         (2006.01)
    *F02M 26/16*        (2016.01)
    *F02M 26/05*        (2016.01)
    *F02M 26/71*        (2016.01)
    *F02M 26/41*        (2016.01)

(52) U.S. Cl.
    CPC .......... *F02D 41/0087* (2013.01); *F02M 26/05* (2016.02); *F02M 26/16* (2016.02); *F02M 26/41* (2016.02); *F02M 26/71* (2016.02); *Y02T 10/144* (2013.01)

(58) Field of Classification Search
    USPC ................................................ 60/612; 3/612
    See application file for complete search history.

(56) References Cited

U.S. PATENT DOCUMENTS

| | | | |
|---|---|---|---|
| 4,303,053 A | 12/1981 | Etoh et al. | |
| 6,141,959 A * | 11/2000 | Digeser | F01N 3/0842 60/274 |
| 6,381,960 B1 | 5/2002 | Maerdberg | |
| 6,871,642 B1 * | 3/2005 | Osterwald | F02B 37/025 123/559.1 |
| 2007/0074513 A1 | 4/2007 | Lamb et al. | |
| 2008/0209889 A1 | 9/2008 | Scheinert | |
| 2011/0000459 A1 * | 1/2011 | Els er | F01N 13/107 123/198 F |
| 2011/0203558 A1 * | 8/2011 | Pappenheimer | F02D 41/005 123/568.18 |
| 2011/0265454 A1 | 11/2011 | Smith et al. | |
| 2014/0331667 A1 * | 11/2014 | Kindl | F02M 26/43 60/602 |
| 2016/0108798 A1 * | 4/2016 | VanDerWege | F02D 41/0087 60/602 |

FOREIGN PATENT DOCUMENTS

| | | | | |
|---|---|---|---|---|
| DE | 10 2009 004 418 A1 | | 7/2010 | |
| DE | 202013102075 U1 * | | 6/2013 | ............ F02D 17/02 |
| DE | 20 2013 102 075 U1 | | 8/2013 | |
| JP | 59-22967 U | | 2/1984 | |
| JP | 2008-128029 A | | 6/2008 | |

OTHER PUBLICATIONS

German Search Report issued in counterpart DE 10 2013 011 587.6 dated Jan. 14, 2014, with Statement of Relevancy (Six (6) pages).
Japanese Office Action issued in Japanese counterpart application No. 2016-524701 dated Dec. 20, 2016, with partial English translation (Seven (7) pages).
Chinese Office Action issued in Chinese counterpart application No. 201480039111.1 dated Jun. 30, 2017, with partial English translation (Twelve (12) pages).

* cited by examiner

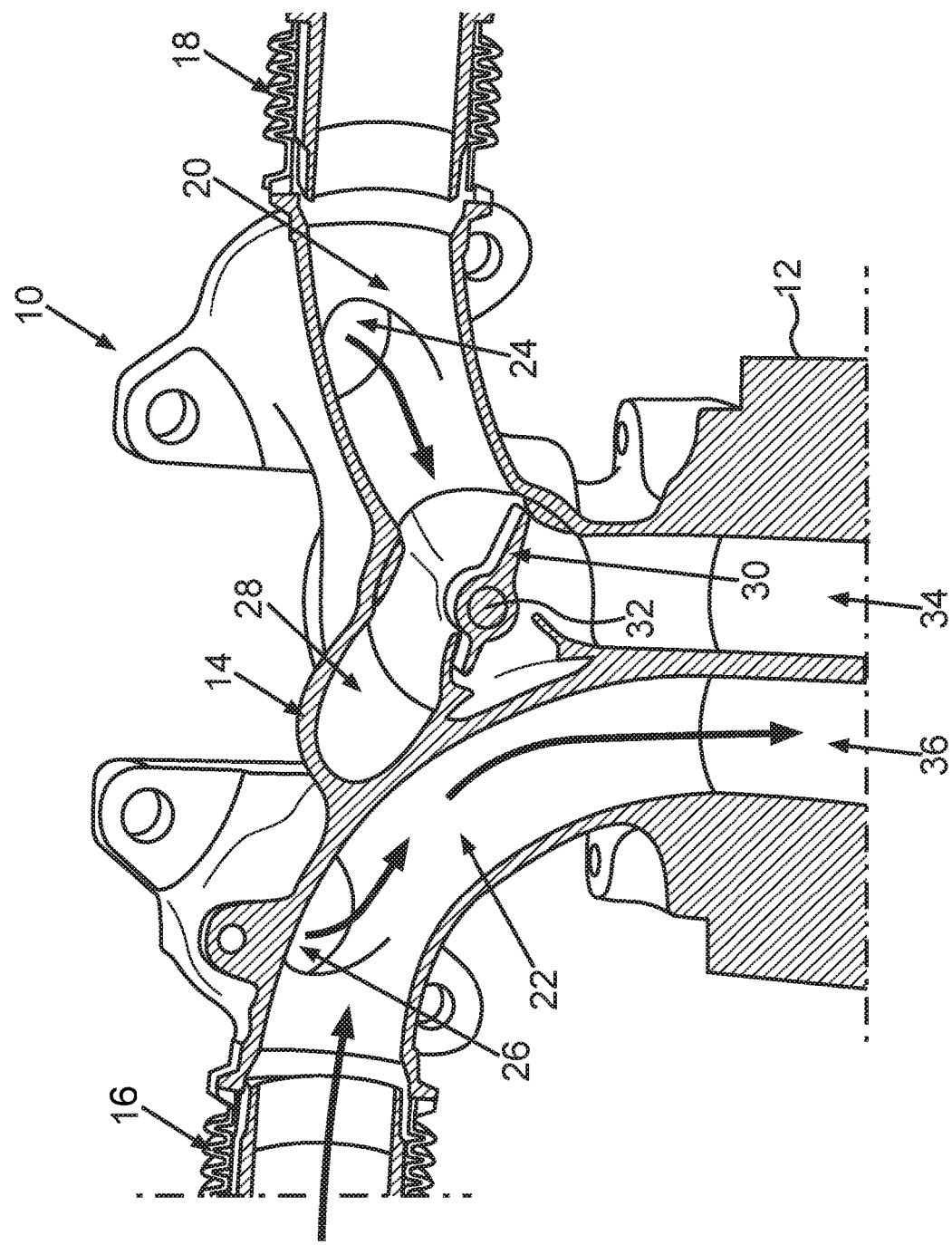

INTERNAL COMBUSTION ENGINE FOR A MOTOR VEHICLE, AND METHOD FOR OPERATING SUCH AN INTERNAL COMBUSTION ENGINE

BACKGROUND AND SUMMARY OF THE INVENTION

The invention relates to an internal combustion engine for a motor vehicle, and to a method for operating such an internal combustion engine.

Such an internal combustion engine as well as a method for operating such an internal combustion engine, are known from the disclosure of DE 10 2008 064 264 A1. The internal combustion engine includes at least two combustion chambers as well as an exhaust gas tract. The exhaust gas tract has at least one exhaust gas duct, which is associated with the combustion chambers and through which exhaust gas from the combustion chambers can flow, in order to guide the exhaust gas to a turbine of an exhaust gas turbocharger In other words, the at least one exhaust gas duct is or can be connected fluidically to the at least two combustion chambers, so that the exhaust gas flows out of the combustion chambers into the at least one exhaust gas duct and flows through the latter.

Furthermore, an exhaust gas recirculation line is provided which is branched off from the exhaust gas duct. By means of such an exhaust gas recirculation line the exhaust gas is at least partially diverted out of the exhaust gas duct and is recirculated from the exhaust gas tract to an intake tract of the internal combustion engine. The recirculated exhaust gas can flow in with fresh air into the combustion chambers and can act as inert gas in combustion processes running in the combustion chambers. As a result the production of so-called hotspots during the combustion processes occurs. Points at which excessive temperatures occur during combustion are referred to as hotspots. As a result of these high local temperatures, increased production of nitrogen oxides can occur at the hotspots. By means of the exhaust gas recirculation system nitrogen oxide emissions (NOx emissions) can be kept low.

Furthermore, an adjustable shut-off element can be provided by means of which a respective cross-section, through which exhaust gas can flow, of the exhaust gas recirculation line and of the exhaust gas duct can be adjusted. Thus one and the same shut-off element makes it possible to change the cross-section of the exhaust gas recirculation line and of the exhaust gas duct through which exhaust gas can flow. The exhaust gas recirculation rate can for example be set appropriately in a simple and favorable manner by means of the control element.

DE 10 2009 004 418 A1 discloses a method for the after-treatment of an exhaust gas stream of a multi-cylinder internal combustion engine of a vehicle, in particular of a commercial vehicle. The internal combustion engine has a plurality of different groups of cylinders, each having an air supply conduit and an exhaust gas conduit associated with it. The exhaust gas conduits open in multiple ducts into an exhaust gas turbine, designed accordingly with multiple ducts, of an exhaust gas turbocharger, wherein an exhaust gas after-treatment element is connected downstream of the exhaust gas turbine. In a heating mode of the internal combustion engine predetermined in accordance with pre-determined operating parameters of the internal combustion engine, in particular in idle or light-load mode of the internal combustion engine, a first part of the cylinder groups formed by at least one heating cylinder group is operated in a fired mode to a predetermined extent, whilst another second part of the cylinder groups formed by at least one shut-down cylinder group is operated in a part-fired mode or in an unfired mode either with a reduced quantity of fuel relative to a defined normal operation and/or relative to a quantity of fuel metered into the at least one heating cylinder group.

An unfired operation of combustion chambers, in particular cylinders, of an internal combustion engine designed for example as a reciprocating internal combustion engine is usually also referred to as cylinder shut-down or as cylinder shut-down mode. Fuel can be saved by such a cylinder shutdown, as usually no fuel is introduced into the combustion chambers which are operated in the unfired mode. However, in the case of such a cylinder shutdown problems may occur with achieving a sufficiently high exhaust gas recirculation rate, that is to say being able to recirculate a sufficiently large quantity of exhaust gas from the exhaust gas tract by means of the exhaust gas recirculation line to the intake tract, in order to be able to keep the production of nitrogen oxides low in the combustion chambers that are still being operated in the fired mode.

It is therefore the object of the present invention to create an internal combustion engine as well as a method for operating such an internal combustion engine by means of which operation of the internal combustion engine can be implemented with particularly low fuel consumption whilst simultaneously achieving sufficiently high exhaust gas recirculation rates.

In order to create an internal combustion engine for a motor vehicle, by means of which operation of the internal combustion engine can be implemented with particularly low fuel consumption whilst simultaneously achieving sufficiently high exhaust gas recirculation rates, it is provided according to the invention that the internal combustion engine can be operated in a cylinder shut-down mode in which introduction of fuel into a first combustion chamber is prevented and introduction of fuel into the second combustion chamber takes place. In other words, in the cylinder shut-down mode the second combustion chamber is supplied with fuel, so that combustion processes run in the second combustion chamber. These combustion processes result in exhaust gas which flows through the exhaust gas duct and can be diverted into the recirculation line which is or can be connected fluidically to the exhaust gas duct.

In the cylinder shut-down mode the first combustion chamber is not supplied with fuel, so that the first combustion chamber is operated in a non-fired or unfired operational state. As a result the fuel consumption of the internal combustion engine can be kept low. However, since exhaust gas from the second cylinder flows through the exhaust gas duct, a particularly large quantity of exhaust gas can be recirculated so that particularly high or sufficient exhaust gas recirculation rates can be achieved. As a result the nitrogen oxide emissions can be kept low.

In this case the exhaust gas recirculation rate is adjustable appropriately by means of the shut-off element, wherein by means of one and the same shut-off element both the cross-section of the exhaust gas duct through which the exhaust gas flows and also the cross-section of the exhaust gas recirculation line through which the exhaust gas flows can be adjusted. In this case, however, every change to the cross-section of the exhaust gas recirculation line through which the exhaust gas can flow is not necessarily accompanied by a change to the cross-section of the exhaust gas duct through which the exhaust gas can flow. However, if the cross-section of the exhaust gas duct through which the exhaust gas can flow is decreased by means of the shut-off element, a particularly simple setting of a particularly high exhaust gas recirculation rate can be achieved in this way.

The cylinder shut-down mode, which is usually also referred to as cylinder shut-down, is preferably set in the partial-load mode of the internal combustion engine, in which a torque of the internal combustion engine required by the driver of the motor vehicle can also be provided when only a part of the combustion chambers thereof is operated in a fired mode and another part of the combustion chambers is operated in an unfired mode, that is to say they are operated in the cylinder shut-down mode.

In an advantageous embodiment of the invention the shut-off element can be shifted between a first position and at least one second position. In the cylinder shut-down mode the shut-off element is shifted into the second position, in which the cross-section of the exhaust gas recirculation line is enlarged relative to the first position and the cross-section of the exhaust gas duct is reduced in size. As a result particularly large quantities of the exhaust gas flowing through the exhaust gas duct are diverted and flow through the exhaust gas recirculation line, so that as a result particularly high exhaust gas recirculation rates are feasible.

It has been shown to be particularly advantageous if the cross-section of the exhaust gas duct is shut off fluidically by means of the shut-off element in the second position. As a result, in the cylinder shut-down mode at least substantially all of the exhaust gas flowing through the exhaust gas duct or flowing into the exhaust gas duct and flowing at least to the exhaust gas recirculation line can be drawn off from the exhaust gas duct and delivered to the exhaust gas recirculation line, in order thus to be able to achieve particularly high exhaust gas recirculation rates in spite of the cylinder shut-down being carried out.

In a particularly advantageous embodiment of the invention it is provided that, by comparison with different positions into which the shut-off element can be shifted, the second position is a position which frees the cross-section of the exhaust gas recirculation line to the maximum extent. In other words the shut-off element can be shifted into a plurality of positions which do not shut off the cross-section of the exhaust gas recirculation line but at least partially free it, also including the second position. In this case the second position is the position in which the cross-section of the exhaust gas recirculation line is freed relative to the other positions which at least partially frees the cross-section of the exhaust gas recirculation line to the utmost, that is to say to the maximum extent. As a result flow resistances for the exhaust gas flowing through the exhaust gas recirculation line can be kept low, so that a particularly large quantity of the exhaust gas can be recirculated in a short time.

In a further advantageous embodiment of the invention the internal combustion engine has at least one third combustion chamber, wherein the exhaust gas tract has at least one second exhaust gas duct which is associated with the third combustion chamber, and through which exhaust gas from the third combustion chamber can flow and which is at least partially separated fluidically from the exhaust gas duct for guiding the exhaust gas to the turbine. In other words, the second exhaust gas duct is or can be connected fluidically to the third combustion chamber, so that the exhaust gas from the third combustion chamber can flow into the second exhaust gas duct and can flow through the latter. In this case it is provided that an introduction of fuel into the third combustion chamber takes place in the cylinder shut-down mode. As a result high outputs or torques can also be provided by the internal combustion engine in the cylinder shut-down mode.

In this case it has been shown to be particularly advantageous if the first exhaust gas duct is associated with a first turbine duct and the second exhaust gas duct is associated with a second turbine duct of the turbine which is at least partially separated fluidically from the first turbine duct. In this case the first turbine duct has a smaller flow cross-section through which the exhaust gas can flow than the second turbine duct. In other words, the first exhaust gas duct serves for guiding the exhaust gas to the first turbine duct. Thus the exhaust gas can flow in from the first exhaust gas duct into the first turbine duct. The second exhaust gas duct serves for guiding the exhaust gas to the second turbine duct, wherein the exhaust gas from the second exhaust gas duct can overflow into the second turbine duct.

In this case the turbine ducts are designed asymmetrically with respect to one another, the first turbine duct being smaller than the second turbine duct. Thus the first turbine duct has a better accumulation characteristic for the exhaust gas than the second turbine duct, so that in this way particularly high exhaust gas recirculation rates are feasible. The cylinder shut-down for reducing the fuel consumption takes place in the first combustion chamber and thus in a combustion chamber associated with the first exhaust gas duct and thus to the first turbine duct, whilst the third combustion chamber associated with the second exhaust gas duct and the second turbine duct is supplied with fuel in the cylinder shut-down mode and consequently is operated in a fired mode.

It is preferably provided that the number of combustion chambers which are associated with the second exhaust gas duct and the second turbine duct, and which are supplied with fuel in the cylinder shut-down mode, is greater than the number of combustion chambers of the internal combustion engine which are associated with the first exhaust gas duct and thus with the first turbine duct, and which are supplied with fuel in the cylinder shut-down mode. All combustion chambers of the internal combustion engine which are associated with the second exhaust gas duct and thus with the second turbine duct are preferably supplied with fuel in the cylinder shut-down mode and consequently are operated in a fired mode. As a result, the second exhaust gas duct and the second turbine duct are used for guiding a predominant part of the entire exhaust gas from the internal combustion engine. Since the second turbine duct is larger than the first turbine duct, flow resistances for the predominant part of the exhaust gas can be kept low, so that a particularly high degree of efficiency of the internal combustion engine is achieved. This is accompanied by operation which is efficient and thus economical in terms of fuel consumption.

Furthermore the smaller, first turbine duct or the first exhaust gas duct corresponding thereto can be used in order to achieve particularly high exhaust gas recirculation rates. The second combustion chamber associated with the first exhaust gas duct is used as a dispenser cylinder from which the exhaust gas is at least partially and preferably completely recirculated.

In order to create a method by means of which operation of the internal combustion engine can be achieved with particularly low fuel consumption and particularly high recirculation rates, it is provided according to the invention that the internal combustion engine is operated in a cylinder shut-down mode in which introduction of fuel into a first combustion chamber is prevented and introduction of fuel into the second combustion chamber takes place. In other words, in the cylinder shut-down mode fuel is introduced into the second combustion chamber, so that this chamber is operated in a fueled or fired operational state in which combustion processes run in the second combustion chamber. These combustion processes result in exhaust gas which can be recirculated by means of the exhaust gas recirculation line to an intake tract of the internal combustion engine.

In the cylinder shut-down mode the first combustion chamber is not supplied with fuel, so that the first combustion chamber is operated in an unfired or non-fired operational state. As a result can fuel savings can be made. Advantageously embodiments of the internal combustion engine according to the invention may be regarded as advantageous embodiments of the method according to the invention and vice versa.

In an advantageous embodiment of the invention the shut-off element can be shifted between a first position and at least one second position, wherein the shut-off element is shifted into the second position in the cylinder shut-down mode, so that the cross-section of the exhaust gas recirculation line is enlarged relative to the first position and the cross-section of the exhaust gas duct is reduced in size. Due to the reduction in size of the cross-section of the exhaust gas duct a backing-up or accumulation characteristic of the exhaust gas duct is set, so that particularly large quantities of exhaust gas can be recirculated. Furthermore, the cross-section of the exhaust gas recirculation line is freed in such a way that the large quantity of the exhaust gas can flow through the exhaust gas recirculation line in a manner which is favorable in terms of flow, so that particularly large quantities of the exhaust gas can be recirculated in a short time.

It has been shown to be particularly advantageous if the cross-section of the exhaust gas duct is shut off fluidically by means of the shut-off element in the second position. As a result, all of the exhaust gas flowing through the exhaust gas duct to the exhaust gas recirculation line can be used and recirculated.

Further advantages, characteristics and details of the invention can be seen from the following description of a preferred exemplary embodiment and with reference to the drawing. The features and combinations of features stated above in the description and the features and combinations of features stated below in the description of the drawing and/or shown in the single drawing can be used not only in the specified combination in each case, but also in other combinations or in isolation without departing from the scope of the invention.

BRIEF DESCRIPTION OF THE DRAWING

The single FIGURE of the drawing shows, as a detail, a schematic sectional view of an exhaust gas tract of an internal combustion engine including a plurality of combustion chambers in the form of cylinders, wherein a shut-off element is provided by means of which a respective cross-section, through which exhaust gas can flow, of an exhaust gas duct and of an exhaust gas recirculation line of the internal combustion engine can be adjusted.

DETAILED DESCRIPTION OF THE DRAWING

The drawing shows an exhaust gas tract 10 for an internal combustion engine of a motor vehicle. The internal combustion engine is designed as a reciprocating internal combustion engine and is used as a drive assembly for driving the motor vehicle. In this case the internal combustion engine includes a plurality of combustion chambers in the form of cylinders. The internal combustion engine is designed for example as a 6-cylinder engine and consequently comprises six cylinders. In a respective fired operation of the cylinders fuel is introduced into the cylinders. As a result a fuel-air mixture is formed in the respective cylinder and is burned. This means that in the respective fired operation combustion processes run in the respective cylinders and result in exhaust gas.

The fuel is for example a liquid fuel in the form of petrol or diesel, which is for example injected directly into the cylinder by means of a respective injector.

The exhaust gas tract 10 through which the exhaust gas can flow serves to draw off the exhaust gas from the cylinders. A turbine 12 which is shown particularly schematically in the drawing and to which the exhaust gas is guided is disposed in the exhaust gas tract. The turbine 12 is a component of an exhaust gas turbocharger of the internal combustion engine which also includes a compressor. A turbine wheel disposed in a turbine housing of the turbine 12 can be driven by the exhaust gas and is connected non-rotatably to a shaft of the exhaust gas turbocharger to which a compressor wheel of the compressor is connected. Thus the compressor can be driven by the turbine wheel. The compressor serves for compressing air which is delivered to the internal combustion engine by means of an intake tract (not shown in the drawing). The compressed air flows through the intake tract into the cylinders in which the respective fuel-air mixture is formed from the air and the introduced fuel.

The exhaust gas tract 10 includes an exhaust gas guiding element 14 as well as two exhaust gas pipes 16, 18. The exhaust gas guiding element 14 has a first exhaust gas duct 20 through which exhaust gas can flow and a second exhaust gas duct 22 through which exhaust gas can flow. The exhaust gas ducts 20, 22 are at least partially and preferably predominantly separated fluidically from one another. A first, a second and a third of the six cylinders are associated with the first exhaust gas duct 20, wherein a fourth, a fifth and the sixth of the six cylinders are associated with the second exhaust gas duct 22. This means that the exhaust gas from the first, the second and the third cylinders flows or can flow into the first exhaust gas duct 20, whilst the exhaust gas from the fourth, the fifth and the sixth flows or can flow into the second exhaust gas duct 22. The first and the second cylinder are or can be fluidically connected for example by means of the exhaust gas pipe 18 to the first exhaust gas duct 20, whilst the third cylinder is or can be fluidically connected by means of a through opening 24 of the exhaust gas guiding element 14 to the first exhaust gas duct 20. For example the fourth and the fifth cylinder are or can be fluidically connected by means of the exhaust gas pipe 16 to the second exhaust gas duct 22, whilst the sixth cylinder is or can be fluidically connected by means of a through opening 26 of the exhaust gas guiding element 14 to the second exhaust gas duct 22. The first, the second and the third cylinder are associated with a first cylinder bank, whilst the fourth, the fifth and the sixth cylinder are associated with a second cylinder bank of the internal combustion engine.

The internal combustion engine also includes an exhaust gas recirculation line 28 which can be seen as a detail. The exhaust gas recirculation line 28 is diverted from the first exhaust gas duct 20. This means that the exhaust gas recirculation line 28 is or can be fluidically connected to the first exhaust gas duct 20. As a result at least a part of the exhaust gas flowing through the first exhaust gas duct 20 or a part of the exhaust gas flowing into the first exhaust gas duct 20 and at least to the exhaust gas recirculation line 28 can be diverted and can be introduced into the exhaust gas recirculation line 28. The exhaust gas diverted from the first exhaust gas duct 20 can be recirculated via the exhaust gas recirculation line 28 from the exhaust gas tract 10 to the intake tract and is fed there to the air to be delivered to the internal combustion engine. The recirculated exhaust gas flows with the air into the cylinders and acts as inert gas in the combustion processes. As a result the production of locally undesirable high temperatures in the combustion processes can be avoided, so that as a result the nitrogen oxide emissions ($NO_x$ emissions) can at least be kept low.

The exhaust gas tract 10 includes an adjustable shut-off element in the form of a valve 30, which is disposed in the exhaust gas guiding element 14 and is pivotable therein about a pivot axis 32 relative to the exhaust gas guiding element 14 between at least two positions. A motor, in particular in the form of an electric motor (not shown in the drawing) is for example provided for pivoting of the valve 30.

As can be seen from the drawing, by means of the valve 30 it is possible to adjust both a cross-section of the exhaust gas recirculation line 28 through which exhaust gas can flow and also a cross-section of the first exhaust gas duct 20 through which exhaust gas can flow. The valve 30 is for example pivotable between a first position (not shown in the drawing) and a second position which is shown in the drawing. In relation to the exhaust gas recirculation line 28 and/or the cross-section thereof, the first position is a closed position in which the cross-section of the exhaust gas recirculation line 28 and thus the exhaust gas recirculation line 28 itself is shut off fluidically. In the closed position the exhaust gas flowing into the first exhaust gas duct 20 cannot flow out of the first exhaust gas duct 20 into the exhaust gas recirculation line 28. In the closed position the cross-section of the first exhaust gas duct 20 is at least partially freed fluidically, so that the exhaust gas can flow through the first exhaust gas duct 20.

The second position shown in the drawing is a freed position, in which the cross-section of the exhaust gas recirculation line 28 and thus the exhaust gas recirculation line 28 as a whole is freed relative to the closed position, so that exhaust gas can flow out of the first exhaust gas duct 20 into the exhaust gas recirculation line 28. In the freed position the cross-section of the first exhaust gas duct 20 is narrowed relative to the closed position or is at least fluidically shut off in a part-region, wherein this part-region is freed in the closed position. As can be seen from the drawing, the cross-section of the first exhaust gas duct 20 and thus the first exhaust gas duct 20 as a whole in the freed position is fluidically obstructed, so that all of the exhaust gas flowing through the first exhaust gas duct 20 or into the first exhaust gas duct 20 is diverted and is introduced into the exhaust gas recirculation line 28.

If the valve 30 is pivotable into at least one further position different from the first position and from the second position, in which two cross-sections are freed, it is preferably provided that in the closed position of the valve 30 the cross-section of the exhaust gas duct 20 is freed to the maximum extent, i.e. is the greatest, relative to the other positions. Accordingly it is preferably provided that in the freed position of the valve 30 the cross-section of the exhaust gas recirculation line 28 is freed to the maximum extent, i.e. is the greatest. As a result a particular large quantity of exhaust gas can flow through the exhaust gas duct 20 in the closed position or through the exhaust gas recirculation line 28 in the freed position, so that flow resistances and accordingly flow losses can be kept low.

In order to achieve operation of the internal combustion engine which is particularly efficient and thus has a low fuel consumption the engine can be switched over from a normal operating mode into a so-called cylinder shut-down mode. In the normal operating mode all cylinders are operated in a fired mode. This means that in the normal operating mode combustion processes which result in exhaust gas run in each of the cylinders.

In the cylinder shut-down mode, which is also referred to as cylinder shut-down, only a first part of the cylinders is supplied with fuel, whereas a second part of the cylinders is not supplied with fuel. Thus the first part is operated in a fired mode, so that combustion processes which result in exhaust gas only run in the first part of the cylinders. The second part of the cylinders is operated in an unfired mode, so that no combustion processes take place and consequently no exhaust gas is produced in the second part of the cylinders.

In this case it is provided that in the cylinder shut-down mode the first and the second cylinder are shut down, whilst the other cylinders are operated in a fired mode. This means that in the cylinder shut-down mode an introduction of fuel into the first and the second cylinder is prevented, so that no combustion processes take place in the first and in the second cylinder. In the cylinder shut-down mode an introduction of fuel into the third, the fourth, the fifth and the sixth cylinder takes place, so that combustion processes which result in exhaust gas run in these cylinders.

As illustrated in the drawing by directional arrows, in the cylinder shut-down mode the first exhaust gas duct 20 is only supplied with exhaust gas from the third cylinder. The first exhaust gas duct 20 is not supplied with exhaust gas from the first and the second cylinder. In the cylinder shut-down mode the second exhaust gas duct 22 is supplied with exhaust gas from the fourth, the fifth and the sixth cylinder.

The turbine 12 or the turbine housing thereof has a first turbine duct 34 and a second turbine duct 36. The exhaust gas ducts 34, 36 are at least partially and preferably predominantly separated fluidically from one another, and serve to guide the exhaust gas from the internal combustion engine to the turbine wheel. As can be seen from the drawing, the first turbine duct 34 is associated with the first exhaust gas duct 20. This means that the first turbine duct 34 is supplied with exhaust gas by means of the first exhaust gas duct. Thus the first turbine duct 34 is or can be fluidically connected to the first exhaust gas duct 20.

The second turbine duct 36 is associated with the second exhaust gas duct 22. This means that the second turbine duct 36 is supplied with exhaust gas by means of the second exhaust gas duct 22. Thus the second turbine duct 36 is or can be connected fluidically to the second exhaust gas duct 22. In this case the turbine ducts 34, 36 are designed asymmetrically relative to one another, wherein the turbine duct 34 is smaller than the turbine duct 36. This means that the turbine duct 34 has a smaller flow cross-section, through which exhaust gas can flow, than the second turbine duct 36. Thus the first turbine duct 34 has a better accumulation characteristic than the second turbine duct 36, so that by means of the first turbine duct 34 and thus by means of the first exhaust gas duct 20 particularly high quantities of exhaust gas accumulate or back up and can consequently be recirculated. The same also applies to the exhaust gas ducts 20, 22, if the adjustability of the cross-section of the first exhaust gas duct 20 by means of the valve 30 is initially disregarded. This means that the first exhaust gas duct 20 in principle has a smaller cross-section through which exhaust gas flows than the second exhaust gas duct 22, and preferably even if the valve 30 is in its closed position.

It is also conceivable for the asymmetrically designed turbine 12 to be additionally provided with a variable turbine geometry. In this case both turbine ducts 34 and 36 can have a respective or a common variable turbine geometry. Preferably one single variable turbine geometry is provided which acts on the larger turbine duct 36. Exhaust gas turbochargers or turbines with variable turbine geometry (VTG) are well known from the prior art.

Thus in the cylinder shut-down mode a predominant part of the entire exhaust gas from the internal combustion engine flows through the second exhaust gas duct 22. This means that in the cylinder shut-down mode the second exhaust gas duct 22 which is larger than the first exhaust gas duct 20 and the second turbine duct 36 which is larger than the first turbine duct 34 are used in order to guide the exhaust gas. As a result, due to the respective larger cross-section or flow cross-section of the second exhaust gas duct 22 and the second turbine duct 36, a particularly high degree of efficiency of the internal combustion engine can be achieved, resulting in a particularly low fuel consumption.

In order nevertheless to be able to recirculate particularly large quantities of exhaust gas, although two or three of the cylinders associated with the first exhaust gas duct 20 are shut down in the cylinder shut-down mode, it is provided that in the cylinder shut-down mode the valve 30 is moved into its freed position, so that the cross-section of the first exhaust gas duct 20 is completely shut off fluidically. In other words the valve 30 is completely opened, so that the small turbine duct 34 is shut off fluidically and the entire exhaust gas mass of the third cylinder is recirculated by means of the exhaust gas recirculation line 28. As a result for example exhaust gas recirculation rates (EGR rates) of 25% can be presented. This allows a particularly economical operation of the internal combustion engine. Thus the third cylinder, which in the cylinder shut-down mode is still in the fired state, is used as dispenser cylinder in order to be able to present particularly high exhaust gas recirculation rates.

The invention claimed is:

1. An internal combustion engine for a motor vehicle, comprising:
    a first, a second, and a third combustion chamber;
    an exhaust gas tract with a first exhaust gas duct which is associated with the first and the second combustion chambers, wherein an exhaust gas from the first and the second combustion chambers is flowable though the first exhaust gas duct to guide the exhaust gas from the first and the second combustion chambers to a turbine of an exhaust gas turbocharger; and
    an exhaust gas recirculation line branching off from the first exhaust gas duct and having an adjustable shut-off element;
    wherein the exhaust gas tract has a second exhaust gas duct which is associated with the third combustion chamber, wherein an exhaust gas from the third combustion chamber is flowable through the second exhaust gas duct and wherein the second exhaust gas duct is at least partially separated fluidically from the first exhaust gas duct;
    and wherein the internal combustion engine is operable in a cylinder shut-down mode in which introduction of fuel into the first combustion chamber is prevented and introduction of fuel into the second combustion chamber takes place and introduction of fuel into the third combustion chamber takes place.

2. The internal combustion engine according to claim 1, wherein the shut-off element is shiftable between a first position and a second position and wherein when the shut-off element is shifted into the second position in the cylinder shut-down mode a cross-section of the exhaust gas recirculation line is enlarged relative to the first position and a cross-section of the first exhaust gas duct is reduced in size.

3. The internal combustion engine according to claim 2, wherein the cross-section of the first exhaust gas duct is shut off fluidically by the shut-off element in the second position.

4. The internal combustion engine according to claim 2, wherein the second position enlarges the cross-section of the exhaust gas recirculation line to a maximum extent.

5. The internal combustion engine according to claim 1, wherein the first exhaust gas duct is associated with a first turbine duct of the turbine and the second exhaust gas duct is associated with a second turbine duct of the turbine, wherein the second turbine duct is at least partially separated fluidically from the first turbine duct, and wherein the first turbine duct has a smaller flow cross-section than the second turbine duct.

6. A method for operating an internal combustion engine for a motor vehicle, the internal combustion engine comprising:
    a first, a second, and a third combustion chamber;
    an exhaust gas tract with a first exhaust gas duct which is associated with the first and the second combustion chambers, wherein an exhaust gas from the first and the second combustion chambers is flowable though the first exhaust gas duct to guide the exhaust gas from the first and the second combustion chambers to a turbine of an exhaust gas turbocharger; and
    an exhaust gas recirculation line branching off from the first exhaust gas duct and having an adjustable shut-off element;
    wherein the exhaust gas tract has a second exhaust gas duct which is associated with the third combustion chamber, wherein an exhaust gas from the third combustion chamber is flowable through the second exhaust gas duct and wherein the second exhaust gas duct is at least partially separated fluidically from the first exhaust gas duct;
    and wherein the internal combustion engine is operable in a cylinder shut-down mode in which introduction of fuel into the first combustion chamber is prevented and introduction of fuel into the second combustion chamber takes place and introduction of fuel into the third combustion chamber takes place;
    and comprising the step of:
    operating the internal combustion engine in the cylinder shut-down mode.

7. The method according to claim 6, wherein the shut-off element is shiftable between a first position and a second position and wherein the shut-off element is shifted into the second position in the cylinder shut-down mode such that a cross-section of the exhaust gas recirculation line is enlarged relative to the first position and a cross-section of the first exhaust gas duct is reduced in size.

8. The method according to claim 7, wherein the cross-section of the first exhaust gas duct is shut off fluidically by the shut-off element in the second position.

\* \* \* \* \*